United States Patent [19]

Geczy

[11] Patent Number: 4,732,491
[45] Date of Patent: Mar. 22, 1988

[54] DOWNHOLE MOTOR BEARING ASSEMBLY

[75] Inventor: Bela Geczy, Orange, Calif.

[73] Assignee: Smith International, Inc., Newport Beach, Calif.

[21] Appl. No.: 900,677

[22] Filed: Aug. 27, 1986

[51] Int. Cl.⁴ .................... E21B 10/22; F16C 17/10; F16C 33/12
[52] U.S. Cl. .................... 384/95; 175/320; 384/420; 384/424
[58] Field of Search .............. 384/420, 92, 95, 424, 384/228, 276, 280, 282–285, 297, 304, 313, 368, 107, 121, 122; 175/227, 320

[56] References Cited

U.S. PATENT DOCUMENTS

| T102,901 | 4/1983 | Offenbacher | 384/95 X |
|---|---|---|---|
| 2,331,584 | 10/1943 | Underwood | 29/149.5 |
| 2,581,252 | 1/1952 | Goetzel et al. | 75/22 |
| 3,127,224 | 3/1964 | Owens et al. | 308/240 |
| 3,456,746 | 7/1969 | Garrison et al. | 175/320 |
| 3,879,094 | 4/1975 | Tschirky et al. | 384/420 |
| 4,017,480 | 4/1977 | Baum | 428/601 |
| 4,146,080 | 3/1979 | Baum | 164/97 |
| 4,169,637 | 10/1979 | Voitas | 384/276 |
| 4,199,201 | 4/1980 | Trzeciak | 384/92 |
| 4,410,054 | 10/1983 | Nagel et al. | 384/95 X |
| 4,468,138 | 8/1984 | Nagel | 384/420 X |
| 4,560,014 | 12/1985 | Geczy | 384/285 X |

FOREIGN PATENT DOCUMENTS

| 770060 | 9/1955 | United Kingdom . |
|---|---|---|
| 805638 | 12/1955 | United Kingdom . |
| 2054064 | 4/1973 | United Kingdom . |

Primary Examiner—Stuart S. Levy
Assistant Examiner—Thomas R. Hannon
Attorney, Agent, or Firm—Price, Gess & Ubell

[57] ABSTRACT

A downhole drive shaft and bearing structure having a unitary, generally cylindrical housing with a radial bearing surface affixed to its interior; a drive shaft having a radial bearing surface affixed to its exterior and thrust bearing inserts mounted at the bit end thereof; and a drive shaft cap affixed to the drive shaft and carrying thrust bearing inserts, the thrust bearing inserts of the cap and drive shaft interfacing with oppositely disposed inserts mounted in the housing.

6 Claims, 3 Drawing Figures

DOWNHOLE MOTOR BEARING ASSEMBLY

BACKGROUND OF THE INVENTION

The subject invention pertains to bearings and more particularly to an improved bearing structure for supporting the drive shaft of a downhole well drilling motor.

The design of bearing assemblies which will withstand the hostile environments and force loads typically encountered in downhole well drilling presents a continuing challenge to the industry. The extremely high temperatures encountered preclude the successful application of sealed technology as it currently exists. Thus, the prior art has turned to bearing structures exposed to the drilling fluids passing through the downhole motor.

In the prior art, two separate bearings have typically been provided to accommodate the forces on the drive shaft of the downhole motor. The bearings have typically been designed such that one bearing accommodates radial forces and the second, separate bearing accommodates thrust loads. Typical bearing materials have included poly-crystalline diamond (PCD), ceramics, and tungsten carbide matrix. Bearing inserts, including PCD faced inserts, have also been employed in prior art designs.

Prior art designs for mounting the bearings in downhole motors have required close manufacturing tolerances, numerous parts and a relatively long assembly time. It has appeared desirable to the inventor to design an improved bearing structure which would considerably reduce tolerance requirements, part count and assembly time while increasing bearing lifetime, and avoiding bearing seal problems.

SUMMARY OF THE INVENTION

It is therefore an object of the invention to provide an improved bearing structure.

It is another object of the invention to reduce the assembly time of bearings in a downhole motor bearing assembly.

It is another object of the invention to significantly reduce the number of parts in a downhole motor bearing assembly.

It is another object of the invention to increase bearing lifetime over prior art structures.

It is yet another object of the invention to eliminate the necessity for close manufacturing tolerances attendant to prior art bearing assemblies.

It is still another object of the invention to avoid bearing seal problems associated with prior art structures.

According to the invention, appropriate radial and thrust bearing elements are incorporated into the drive shaft and the drive shaft housing of the tool. A radial bearing surface is applied to the cylindrical interior of the housing and to the opposite cylindrical exterior of the drive shaft. Mounting surfaces are provided on the drive shaft wherein thrust bearing inserts are disposed opposite cooperating thrust bearing inserts in the housing. In the preferred embodiment, one thrust bearing mounting surface is provided on the drive shaft and another is provided on its cooperating shaft cap.

The approach of the invention eliminates the need for high tolerances and reduces parts to a minimum. It also facilitates an increased amount of bearing surface and longer bearing lifetime. The relative part count is reduced from a count on the order of fifty to sixty for a typical prior art assembly to four for the preferred embodiment. An additional advantage of the invention is that the radial bearing controls lubricating fluid flow. As a result, the bit pressure drop can be much higher, increasing bit horsepower.

BRIEF DESCRIPTION OF THE DRAWINGS

The just summarized invention will now be described in conjunction with the drawings of which.

DETAILED DESCRIPTION OF THE PREFERRED EMBODIMENT

Figure 1:
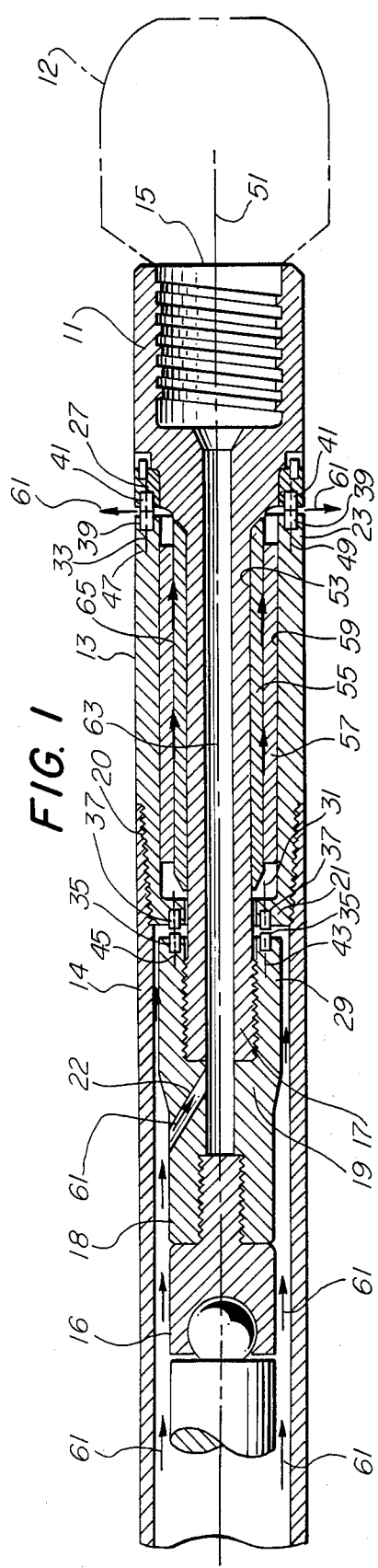
FIG. 1 is a cross-sectional drawing illustrating the preferred embodiment of the invention.

FIG. 1 illustrates a drive shaft 11 mounted within a unitary shaft housing 13. The drive shaft 11 typically drives a drill bit 12 mounted at the bit end 15 of the drive shaft 11. The opposite end 17 of the drive shaft 11 is threaded into a drive shaft cap 19. The shaft cap 19 has a bore 22 therein which permits passage of drilling fluid 61.

In a typical downhole motor, the drive shaft 11 is attached to a connecting rod assembly 16 at a threaded connection 18 in the shaft cap 19. The shaft housing 13 is threaded into the connecting rod housing 14 at a threaded connection 20.

As may be seen, the drive shaft 11 extends out of the opposite ends 21, 23 of the housing 13. The bit end 15 of the drive shaft 11 provides a flange-like or radially widened cylindrical surface upon which a thrust bearing mounting race 27 is fixed. The shaft cap 19 also provides a thrust bearing mounting surface 29. In effect, the shaft cap 19 provides a flange-like widening of the drive shaft 11 opposite the upper end 21 of the drive shaft housing 13.

The shaft housing 13 has thrust bearing mounting surfaces or races 31, 33 at its opposite ends 21, 23. The shaft housing thrust bearing surfaces 31, 33 are disposed adjacent the thrust bearing surfaces 27, 29 provided in the shaft cap 19 and the bit end 15 of the drive shaft 11.

Thrust bearing inserts 35, 37, 39, 41 are mounted in corresponding cylindrical holes or wells in the thrust bearing surfaces 29, 31, 33, 27. The axes 43, 45, 47 49 of the cylindrical wells are parallel to and radially arrayed at a common radius about the central axis 51 of the drive shaft 11 and housing 13. The thrust bearing inserts 35, 37, 39, 41 preferably have planar bearing faces fabricated of poly-crystalline diamond, as known in the prior art.

As a result of this geometry, the inserts 39 are disposed across from and interface with the inserts 41 to form a lower thrust bearing. Similarly, the bearing inserts 35 interface with the inserts 37 to form an upper thrust bearing. The planar faces of each set of inserts, e.g., 37, lie in a common plane perpendicular to the central axis 51.

In operation, the lower thrust bearing inserts 39, 41 accommodate thrust forces when the bit is "on-bottom," i.e., in drilling operation. The upper thrust bearing inserts, 35, 37 accommodate thrust forces when the drill is in the "off-bottom mode," i.e., not engaged in a drilling operation.

The drive shaft 11 has a slightly recessed cylindrical area 53 wherein a radial bearing surface 55 is affixed. The shaft housing 13 carries an oppositely disposed radial bearing 57 on its cylindrical interior surface 59. The radial bearings 55, 57 preferably comprise tungsten carbide chips in an infiltrate matrix molded to the surfaces 53, 59 of the shaft housing 13 and drive shaft 11.

In a downhill drilling application, the drilling fluid or "mud" 61 is conducted downwardly through the connecting rod housing 14. The bore 22 diverts part of the drilling fluid 61 through the central cylindrical cavity 63 of the drive shaft 11 and out through the bit end 15. The pressure differential between the bearings 35, 37 and the bit 12 forces a second portion of the drilling fluid 61 along a path between the upper thrust bearings 35, 37, then through the radial matrix bearings 55, 57, through the lower thrust bearings 39, 41 and out into the annulus surrounding the tool. The second portion of drilling fluid functions to cool the bearings.

The maximum flow rate of drilling fluid through the bearings is determined by the annular gap 65 between the radial bearings 55, 57. This gap 65 is determined based on the amount of drilling fluid flow necessary to dissipate heat from the radial bearings 55, 57 when the bearing is under its highest load, i.e., under a radial force sufficient to stall the tool. Calculation of the gap 65 based on drilling fluid temperature, flow rate and the friction generated heat to be removed for a given tool is a matter well within the skill of those ordinarily skilled in the art.

As observed earlier, the radial bearing surfaces 55, 57 are preferably a tungsten carbide matrix bearing structure. In the prior art, bearing surfaces employing tungsten carbide have been manufactured by molding tungsten carbide buttons to a steel radial bearing sleeve utilizing a fine tungsten carbide powder and copper base infiltrant. The buttons are affixed to the surface of the carbon mold in a predetermined pattern which, depending upon size, may utilize on the order of 300 buttons. Once molded into place, the buttons and surrounding matrix must be machine finished. An improved and less expensive bearing surface employing available tungsten carbide chip material may be created from a mixture of, e.g., 60 percent by weight of 80 mesh and down macro-crystalline tungsten carbide powder and 40 percent by weight of TCM 10/18 mesh cemented tungsten carbide cobalt chips. The blend is such that the mixture of powders may be loaded in a cavity surrounding a steel blank and infiltrated with a copper base infiltrant and cooled to provide a bearing surface ready for finishing. The resultant chip matrix may be molded closer to final size, therefore requiring less time to finish compared to the prior art button structure. An additional advantage is that the percentage of tungsten carbide bearing surface area is increased over the molded button approach.

Figure 2:
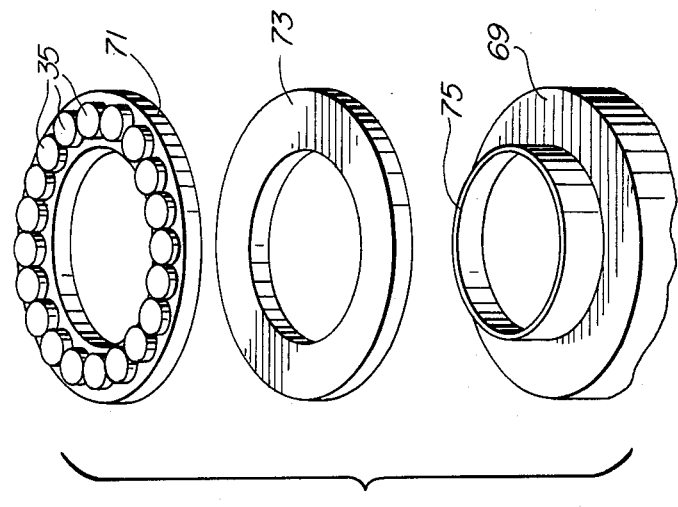
FIG. 2 is a perspective of alternative apparatus for attaching thrust bearing inserts.

The diamond inserts 35, 37, 39, 41 may comprise diamond faced tungsten carbide studs brazed directly into wells in the housing 13, drive shaft 11 and shaft cap 19. An alternative structure for installing such inserts is shown in FIG. 2. According to that structure, a flat annular race 69 may be provided in place of the wells in the housing 13, drive shaft 11, and/or shaft cap 19. Diamond faced tungsten carbide inserts may then be press-fitted into through-holes in an annular steel ring 71 to form a subassembly. Such subassemblies may then be placed over a complementary brazing ring 73 and subjected to induction heating to braze the inserts 35 and ring 71 together and to the race 69. As further shown in FIG. 2, the ring 71 may mount on an aligning hub 75.

In manufacture, the radial bearing surface is applied to the steel housing 13 and drive shaft 11 before insertion of the thrust bearing elements 35, 37, 39, 41 because a higher temperature is required in the process of applying the radial bearing surface than is required to braze the diamond thrust bearing elements into place.

Figure 3:
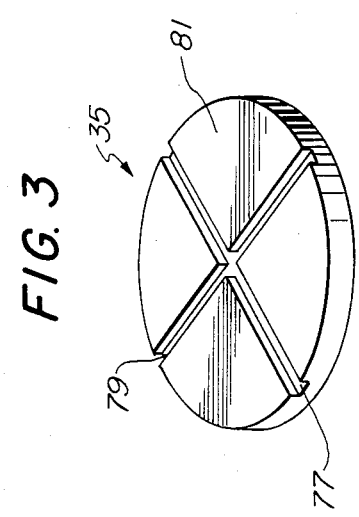
FIG. 3 is a perspective of an improved thrust bearing insert.

FIG. 3 illustrates an improved diamond bearing insert, e.g., 35, wherein cross channels 77, 79 have been scribed into the diamond bearing surface 81, for example by the preferred mode of EDM (electron discharge machining). These channels 77, 79 increase fluid flow and attendant cooling across the bearing surface 81, resulting in a surprising and significant increase in the load carrying abililty of the bearing surface without failure.

The channels 77, 79 are preferably one-thirty second of an inch wide by one-thirty second of an inch deep. It is also preferred that the inserts' bearing surface 81 extend about one thirty second to one sixteenth of an inch above the mounting surface. This spacing creates optimum fluid flow around the inserts 35. It is preferred that the space between the inserts 35 is such as to provide a velocity of fluid flow in the range of fifty to one hundred feet per second. This range provides the maximum rate of cooling without erosion of the bearing support structure.

It may be observed that a single fluid flow channel, e.g., 77, can provide significant improved performance, believed to result from elimination of a dead zone in the cooling fluid flow pattern about the inserts 35. The cross channels 77, 79 provide even better performance.

A downhole motor bearing and drive shaft assembly has now been disclosed which employs four major components: a housing 11, a drive shaft 13, a bearing race 27, and a shaft cap 19. This structure provides a great reduction in parts, shorter assembly time, reduced tolerance problems, and increased bearing lifetime.

It will be apparent to those skilled in the art that the just described preferred embodiment is subject to modification and adaptation without departing from the scope and spirit of the invention. Therefore, it is to be understood that, within the scope of the appended claims, the invention may be practiced other than as specifically described herein.

What is claimed is:

1. A bearing and drive shaft structure for a downhole drilling apparatus comprising:

a unitary housing;

an inner cylindrical surface on the interior of said housing;

a first plurality of cylindrical mounting holes formed in one end of said housing about a first set of axes parallel to the axis of said inner cylindrical surface;

a second plurality of cylindrical mounting holes formed at the opposite end of said housing about a second set of axes parallel to the axis of said inner cylindrical surface;

a matrix bearing surface molded to said cylindrical surface;

a drive shaft means mounted within said housing and extending out of each end of said housing and having a cyindrical outer surface disposed opposite the inner cylindrical surface of said housing;

a matrix bearing surface molded to said cylindrical outer surface;

first and second mounting surfaces formed at each end of said drive shaft means, and opposite said first plurality and second plurality of mounting holes, respectively;

a third plurality of cylindrical mounting holes formed in said first mounting surface about a third set of axes parallel to the axis of said cylindrical outer surface and at the same radius therefrom as said first set of axes;

a fourth plurality of cylindrical mounting holes formed in said second mounting surface about a fourth set of axes parallel to the axis of said cylindrical outer surface and at the same radius therefrom as said second set of axes; and thrust bearing inserts mounted in each of said first, second, third, and fourth plurality of holes, said first and third plurality of holes and second and fourth plurality of holes being disposed on respective common circumferences to form first and second thrust bearings, respectively.

2. The bearing and drive shaft structure of claim 1 wherein said first and second mounting surfaces are substantially annular and lie in planes perpendicular to the axis of said cylindrical outer surface.

3. The structure of claim 1 wherein said drive shaft means includes shaft cap means.

4. A bearing and drive shaft assembly comprising:
a unitary housing having an interior portion which is cylindrical about an axis;
first means at one end of said housing for arraying a first plurality of planar faced thrust bearing elements such that their faces lie in a plane beyond said one end and perpendicular to said axis;
second means at the opposite end of said housing for arraying a second plurality of planar faced thrust bearing elements such that their faces lie in a plane beyond said opposite end and perpendicular to said axis;
a unitary drive shaft means for mounting partially within said housing, for providing a cylindrical exterior portion opposite said interior portion of said housing;
means attached to said unitary drive shaft means for arraying a third plurality of planar faced thrust bearing elements such that their faces lie opposite the faces of said first plurality of bearing elements; and
a unitary shaft cap means for attaching to the end of said drive shaft means and for mounting a fourth plurality of planar faced thrust bearing elements such that their faces lie opposite the faces of said second plurality of bearing elements.

5. The bearing and drive shaft of claim 4 further including a matrix bearing surface formed on said cylindrical interior portion of said housing and said cylindrical exterior portion of said drive shaft.

6. A bearing and drive shaft assembly for an earth boring tool comprising:
a unitary drive shaft having a cylindrical section of a first diameter and a widened end;
a unitary shaft cap attached to said drive shaft, the shaft cap being widened to form an annular shaft cap surface in a plane perpendicular to the axis of said cylinder, said shaft cap surface having a plurality of mounting holes disposed therein about the circumference of a circle;
race means mounted on said widened end of said drive shaft for providing a circularly disposed array of mounting holes;
a unitary housing surrounding a portion of said drive shaft between said annular surface and said mounting means and having a cylindrical interior surface portion and first and second integrally formed annular mounting surfaces, each containing a plurality of circularly arrayed mounting holes;
the first annular surface being disposed opposite said annular shaft cap surface;
the second annular surface being disposed opposite said race means;
diamond faced thrust bearing inserts inserted in each of said mounting holes; and
first and second oppositely disposed radial bearing surfaces employing tungsten carbide formed on said cylindrical interior surface portion of said housing and cylindrical section of said drive shaft, respectively.

* * * * *